United States Patent [19]

Presley

[11] 4,233,154
[45] Nov. 11, 1980

[54] METHOD FOR TREATING PETROLEUM WELL PUMPING POWER FLUID

[75] Inventor: Charles L. Presley, Houston, Tex.

[73] Assignee: Kobe, Inc., Huntington Park, Calif.

[21] Appl. No.: 974,528

[22] Filed: Dec. 29, 1978

[51] Int. Cl.$^2$ ............................................. B01D 21/10
[52] U.S. Cl. .................................... 210/800; 166/267
[58] Field of Search ............ 210/73 R, 73 OW, 242 S, 210/320, 513, 521, 532 R, 537, 538, 540, 210, 221, 97, 104, 83 R; 166/75, 267, 265

[56] References Cited

U.S. PATENT DOCUMENTS

| | | | |
|---|---|---|---|
| 2,771,997 | 11/1956 | Unthank | 210/320 |
| 3,463,172 | 8/1969 | Naylor | 210/521 |
| 3,487,937 | 1/1970 | Koulovatos | 210/220 |
| 3,759,324 | 9/1973 | Mecusker | 210/73 OW |

Primary Examiner—Frank Sever
Attorney, Agent, or Firm—Christie, Parker & Hale

[57] ABSTRACT

A separation compartment of a multiphase separation vessel receives production fluid from a petroleum well and that fluid separates by gravity into the gas, oil and water phases in the vessel. An adjustable siphon leads from a water space in the separation compartment to a discharge compartment of the vessel. The level of the discharge from the siphon determines the elevation of an oil phase-water phase interface within the separation compartment and the presence of the desired of the fluid phases at a pickup for power fluid. The siphon includes a removable line that permits a change in the elevation of the outlet of the line into the discharge compartment. Preferably, the discharge compartment comprises an upstanding pipe, the top of which acts as a weir for receiving oil from the separation compartment. Oil from the vessel may pass through a cyclone for further separation of solids from the oil and then introduced by a pump back into the well to act as the power fluid for the well. Excess oil is taken off as product in a product stream together with production gas and water. An alternate embodiment employs an upstream surge vessel that takes surges in production fluid from the well of a greater flow rate than an established rate and directs excess flow directly to the discharge to bypass the siphon.

6 Claims, 2 Drawing Figures

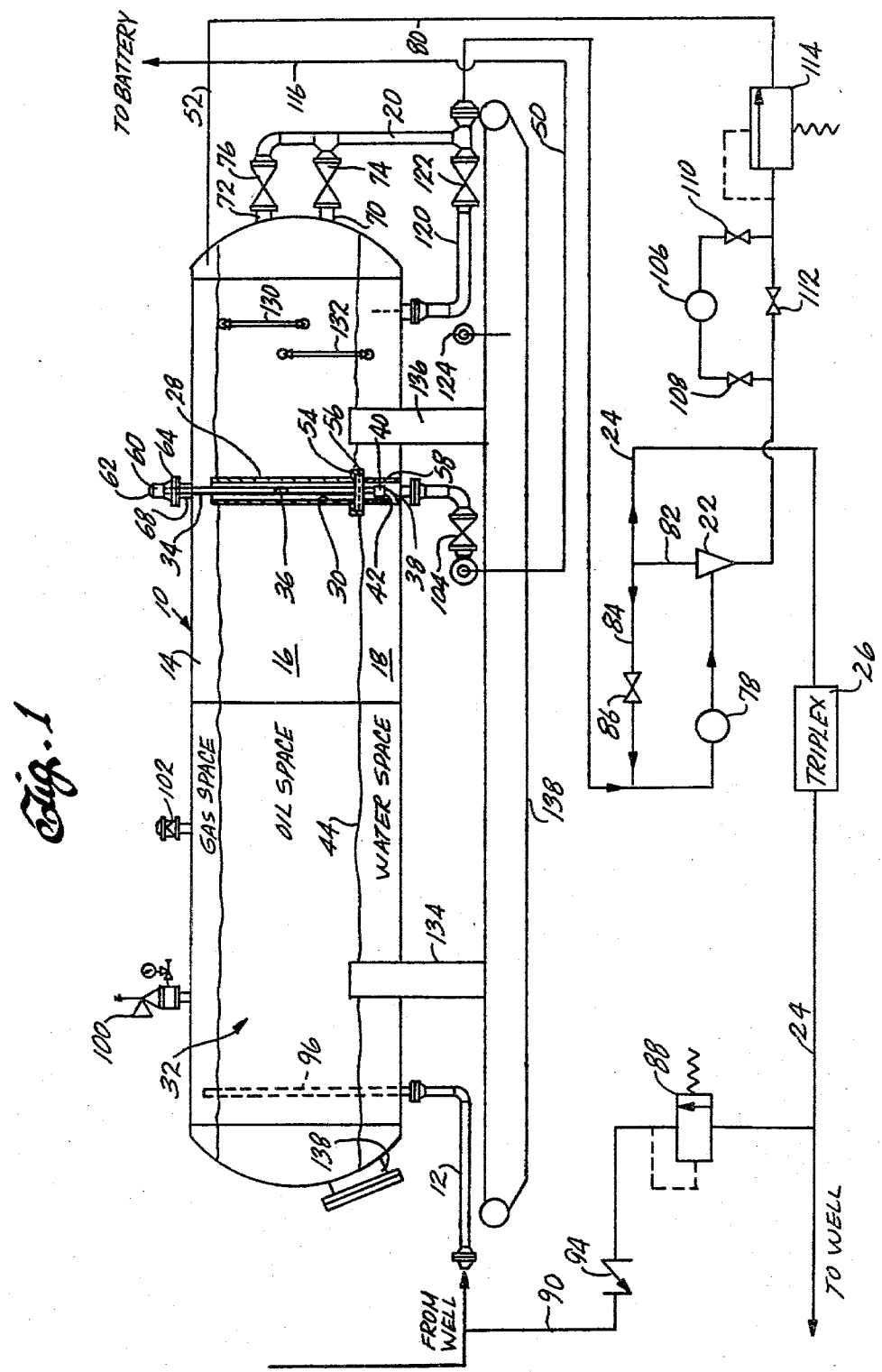

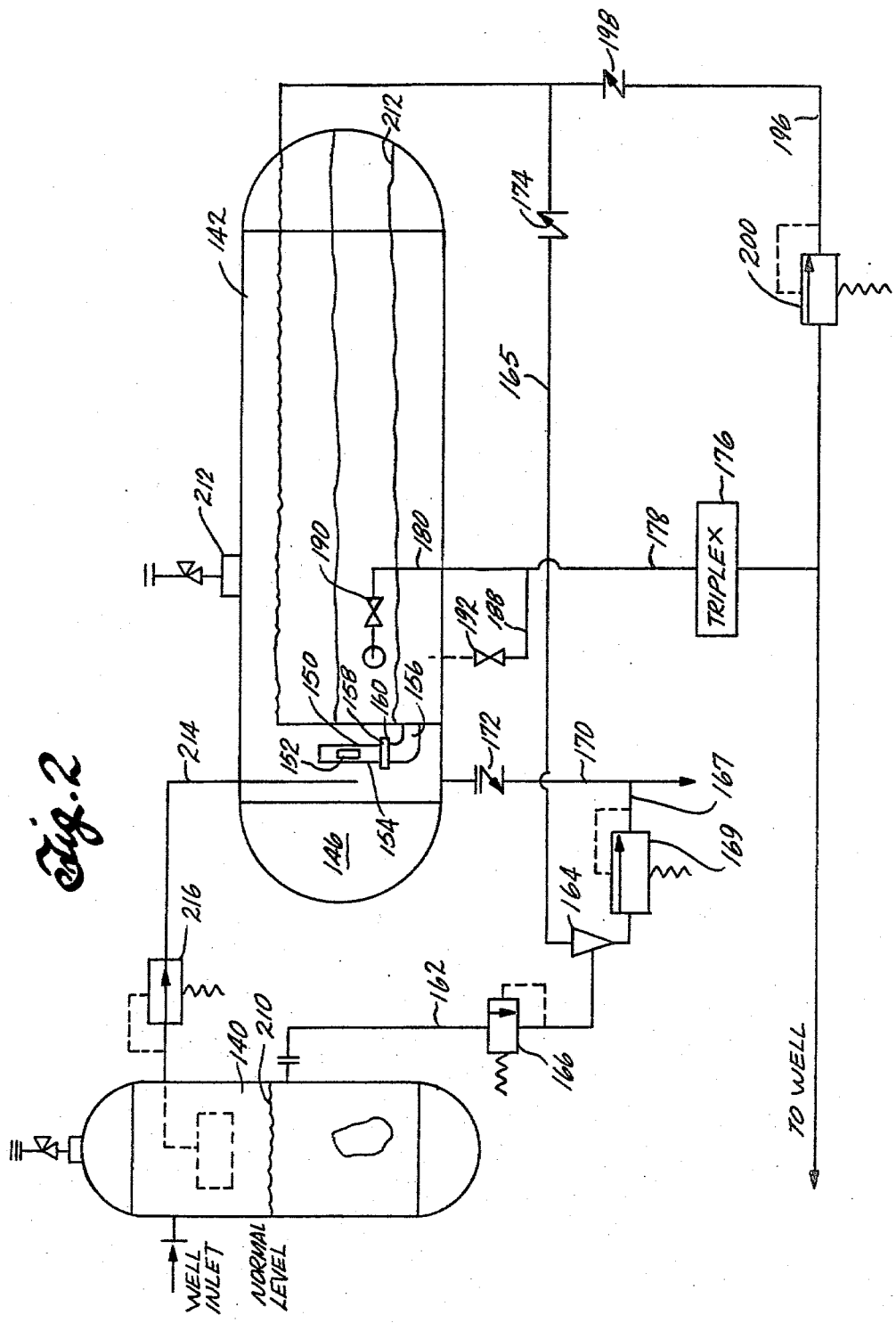

METHOD FOR TREATING PETROLEUM WELL PUMPING POWER FLUID

BACKGROUND OF THE INVENTION

The present invention relates in general to the production of petroleum from petroleum wells, and, in particular, to systems for providing clean power fluid for downwell machinery, such as the engine for pumps.

It is common practice to employ a power fluid to operate machinery downhole in the petroleum well. For example, power fluid can operate the engine of a downhole pump that pumps petroleum from a petroleum bearing formation to the surface. Typically, power fluid is pressurized at the surface to raise its head, as by a multiplex pump. Pressurized power fluid is then fed down into a tubing string of the well to the downhole machinery it operates. Exhaust power fluid is usually brought up the well with well fluid and the two together are called production fluid. Alternatively, power fluid can be maintained separate from well fluid and routed through its own tubing string.

Machinery handling the power fluid, including the downhole machinery, is, of course, sensitive to solid abrasives that are entrained in the production fluid stream leaving the well. Small solid particles in the power fluid can score and damage power fluid circuit machinery. For example, downhole seals of a pump engine can be lost, with a loss of the effectiveness of the engine producing the power for its pump. This loss also requires the lifting of the engine from the well for renewal or replacement. Production time is lost during engine shutdown, which time includes the time lost in raising and lowering the downhole machinery from the well. To get rid of the solid abrasives, the practice has been to separate solids from the power fluid before the power fluid is used again.

The problem of power fluid contamination with solid abrasives is a continuous problem regardless of whether power fluid is maintained in a separate loop or whether power fluid is mixed with well fluid. Accordingly, treatment at the surface to remove solids is continuous.

These are several ways that separation of solids from production fluid have taken place in the past. One approach used a centrifugal pitot cleaner. Centrifugal force separates the phases of the production fluid in a rotating rotor in accordance with the density of the phases. The heavier solid material leaves the rotor through nozzles. Oil may be taken from the rotor through a stationary pitot tap. This system can be used with cyclones that reduce the kinetic head of the fluid and permit solid materials to drop out of suspension.

A second approach used with cyclones or with the pitot separators includes the use of separation tanks or separators. A separator is a large vessel that receives the production fluid and permits the fluid to separate into its phases by gravity. Solids will settle out at the bottom. The next phase will be water, the next after that will be an oil phase, and, in an ullage space above the oil will be a final gaseous phase.

In separation vessels it is desirable to maintain a minimum quantity of power fluid in order to have an adequate reserve for power fluid taken from the vessel to accommodate fluctuations in demand. This minimum quantity of fluid assures adequate volume of fluid to maintain the contents of the tank quiescent, and therefore to avoid mixing the previously separated solids into the fluid. An adequate quantity of fluid in the separation vessel also helps to assure that the proper phase of the liquid is present at the power fluid pickup.

Different petroleum wells have different requirements. Some wells have a very high water content or "cut". When this is the case, water is usually used as a power fluid. Other wells have a high oil cut and for these wells oil is the power fluid. Some wells have a viscous oil that contains sand that is extremely difficult to remove. For these wells, water is the power fluid. To provide a separation vessel suitable for the requirements of different wells requires that different percentage of oil and water cut be accommodated. It is also highly desirable that the serparation vessel have attendant machinery that is as simple as possible.

SUMMARY OF THE INVENTION

The present invention provides an improvement for the cleansing of production fluid to form a power fluid. The improvement includes the facility to determine internally of a phase separation vessel the elevation of an oil-water interface within a prescribed band, without level control valves or pressure regulating valves, and without the need to pressurize the separation vessel to provide a driving pressure to discharge fluid.

In one form the present invention contemplates a separation vessel that receives production fluid from a petroleum well. The separation vessel has a first compartment or separation compartment into which the production fluid separates into its phases of water, oil, and gas, and solids drop out of suspension. A second compartment or discharge compartment within the vessel is separated from the separation compartment, preferably, by a weir. Oil flows over the top of the weir from the separation compartment into the discharge compartment. Water communicates with the discharge compartment through fluid phase level control means for the first compartment that comprise a line in the separation vessel between the first and second compartments with an entrance in the first compartment at the water phase level and an outlet in the second compartment at a level higher than the entrance. Preferably, the fluid phase level control means includes an adjustable siphon that has an inlet opening into the separation compartment in a space thereof near the bottom and corresponding to space occupied by water. An outlet from the siphon into the discharge compartment is at an elevation higher than the inlet. Changing the relative elevation of the outlet with respect to the inlet determines the net driving force that forces water into the discharge compartment and therefore the level of the water-oil interface. Moreover, an adequate reserve of power fluid is maintained at the desired level. The discharge space empties into flow line means that may go to a battery or the like for the collection of production fluids. Power fluid is taken off from either the oil zone or the water zone, depending on the level of the interface and the desired power fluid in the flow line means, and may be subjected to further cleaning of solids as by cyclone separation, and then reintroduced into a well.

The outlet of the siphon determines the level of fluid in both the separation compartment and the discharge compartment, for if the outlet is at a relatively low elevation, fluid will tend to flow out of the separation compartment at a rapid rate while if the outlet is at a higher elevation, fluid flow rate slows down. Obviously, the levation of the outlet is chosen to insure the presence of the desired power fluid at the power fluid takeoff from the vessel.

Preferably, the discharge compartment is defined by an upstanding cylindrical pipe within the separation vessel into which a siphon line extends from the water space within the separation compartment. The elevation of the outlet of the line can be varied merely by changing the line and the outlet. The line may be a nipple that threads into a coupling attached to the cylindrical pipe. The nipple extends out the top of the separation vessel so that it can be readily reached. The position of the outlet in this removable line can vary from line-to-line and accordingly it is very easy to change the oil-water interface. The power fluid may be further cleansed as in a cyclone cleaner. In such a system, a charging pump may feed the cyclone. The underflow from the cyclone may be discharged to a battery or other collection facility. The cleansed flow from the cyclone provides the feed to the pump that forces the power fluid down the well. To maintain proper pressure across the cyclone, the discharge therefrom can be pressure regulated. If desired, a slip stream can be taken from the cyclone and recycled. To insure that the well charging pump does not draw down the separation vessel and that the flow rate from the well charging pump and the flow rate from the well roughly correspond, a flow control valve between the lines to the well and from the well can pass fluid back into the separation vessel from the well charging pump. To avoid problems occasioned by surging, an upstream surging vessel may be provided to directly pass excessive fluid from the well to the discharge compartment and thereby bypass the separation compartment and avoid a flow rate into the separation vessel faster than the flow rate that can be maintained from the separation compartment into the discharge compartment.

Gas may pass directly out the discharge line or, alternatively, a separate line from the gas phase can provide for gas discharge. When oil is desired as the power fluid, the outlet from the water discharge line is made comparatively low so that water will readily flow out of the separation compartment. When water is desired to be the power fluid, the level of the outlet from the water space may be raised so that it is more difficult for water to leave the water separation vessel and oil will more readily flow over the weir and into the discharge compartment.

These and other features, aspects and advantages of the present invention will become more apparent from the following description, appended claims, and drawings.

BRIEF DESCRIPTION OF THE FIGURES

FIG. 1 is a line schematic of the preferred form of the oil separation system of the present invention; and FIG. 2 is a line schematic of an alternate form of the oil separation system of the present invention and shows the use of an upstream surge accommodating vessel.

DESCRIPTION OF THE PREFERRED EMBODIMENTS

FIG. 1 illustrates the preferred form of the petroleum well pumping power fluid unit of the present invention. In general, the Figure shows a separator tank 10 in communication with a petroleum producing well through a line 12. Production fluid of petroleum values, water and solids from the well pass through line 12 into separation tank 10. Either the water or the oil of the production fluid will be used in part as the power fluid for downhole machinery used in the well. This power fluid must be comparatively free of solid abrasive contaminants. Solid particles contaminate the stream from the well. Separator tank 10 separates the solids out of the production fluid and separates the production fluid into its phases. The phases will be gas, oil, and water and will occupy distinct elevation zones. the gas phase will be on top in a space indicated at 14; oil will be below the gas in an oil space indicated by reference numeral 16; and water will be below the oil in a water space indicated by reference numeral 18. The purpose of settling tank 10, then, is to provide a quiescent environment for the separation of production fluid from a petroleum well into its phases and to settle out contained solids and to provide single phase.power fluid for downhole machinery which may be either water or oil. In this specific embodiment oil will be considered the power fluid. Power fluid leaves oil space 16 through a line 20 and enters a cyclone separator 22 where further solids are removed from the oil. The output from separator 22 branches and one branch, represented by a line 24, provides a feed to a pump 26, usually a multiplex pump, on the surface near the well. The power fluid, with its solids content at a low level and its head raised by pump 26, enters the well to do useful work.

Typically, the power fluid drives a downhole engine that in turn powers a pump located downhole that forces well fluid and spent power fluid out of the well and through line 12 back into the separation tank.

The fluid in line 12 has a comparatively large solids content owing to the presence of well fluid or, in the case of a closed loop system for power fluid, line contaminants.

These solids must be removed to avoid undue wear on the downhole machinery. Solids separate from the production fluid in separation tank 10 and accumulate on the bottom of the tank. Cyclone separator 22 removes more solids.

It is necessary to maintain the desired power fluid in an elevational zone for ready pickup and flow out line 20. This requires that the oil-water interface be maintained within prescribed limits within a band. This in turn requires that the water entering the separation vessel on the average equal the amount of water leaving the vessel.

The water level within separation vessel 10 is maintained by the unique construction of the present invention. A stand pipe 28 extends upwardly within separation tank 10 to a point close to the top of the separation tank and at a level corresponding to a desired height of oil. The inside of the stand pipe defines a discharge section or compartment 30 into which oil, gas and water flow. The outside space can be considered a separation compartment and is indicated in general by reference numeral 32. A line 34 extends along the axis of stand pipe 28 through the top of the tank. The line has an outlet 36 intermediate its ends. A line section in the form of a fixed elbow 38 connects onto the bottom of line 34 through a coupling 40. Elbow 38 opens into the separation compartment at an entrance 42 through the wall of the stand pipe. There will be a slight positive pressure within the tank because the gas in gas space 14 is at above atmospheric pressure. This pressure, added to the gravity head of oil in oil space 16 and water space 18, tends to force water through entrance 42 into elbow 38, into line 34, and out outlet 36. The flow of fluid through line 34 is opposed by the height of fluid within the line.

As the outlet gets higher, a greater gravity head opposes water flow. Thus the elevation of outlet 36 determines the flow rate of water flowing through it. Line 34, being readily removed, can be replaced by a line having an outlet at a different elevation. Accordingly, the level of the water-oil interface may be adjusted. (The interface is indicated by reference numeral 44.)

In the event that the flow rate from the well from line 12 into tank 10 falls, the level of fluid within vessel 10 will drop until equilibrium is established between the fluid within line 34 and the fluid within separation compartment 32. This equilibrium will be at a point with fluid in separation compartment 32 above the entrance to line 20. In an aggravated case, fluid in line 34 will drop below the level of outlet 36. When flow of fluid into separation vessel 10 through line 12 becomes large enough, oil will flow over the top of the stand pipe and into its interior. The top of the stand pipe then acts as a weir. Oil and water within the stand pipe flow out of it through a line 50 and may be collected in a storage battery. Gas may also pass out this line and may also leave through a parallel line 52 from gas space 14 to join downstream the effluent flowing through line 50.

Returning to the construction of the stand pipe, the stand pipe has a flange 54 that attaches it to a complementary flange 56 of the stub section 58 of the stand pipe, as by a bolted connection. Stub section 58 attaches to the shell of the vessel as by welding.

A fitting 60 on the outside of the tank has a cap 62 that has a bore receiving the upper end of line 34. Cap 62 has a flange 64 and the cap secures through the flange to a flange 66 of a cylindrical section 68 that is welded to the top of the tank. Removal of cap 62 exposes the end of line 34 and line 34 can then be unthreaded from coupling 40 and a different line 34 installed with a different height outlet 36 to effect a different level of interface 44.

As previously related, power fluid leaves tank 10 through line 20. Line 20 has upper and lower connecting branches 70 and 72, having valves 74 and 76, respectively, to permit selection of which of the lines 70 and 72 feeds line 20. Usually line 70 is employed. Line 20 leads to the inlet of a charging pump 78 and leaves the charging pump at a higher head and enters cyclone cleaner 22. The underflow from the cyclone cleaner leaves in line 80. The cleansed flow leaves the cyclone in a line 82 which branches into line 24 and a second line 84. A flow control valve 86 in line 84 determines the rate of flow through it. Line 84 recirculates oil from the cyclone 22 back into line 20 to remove more solids. Line 24 leads to a well.

A flow control valve 88 in a line 90 that extends between lines 12 and 24 circulates oil from line 24 back into line 12 when the pressure in the latter drops below a prescribed value indicative of insufficient flow from the well to maintain adequate reserve in the separation vessel. A check valve 94 in line 90 prevents flow from line 12 into line 24.

Line 12 extends into tank 10 through a riser 96 that terminates in the gas space. Thus the discharge from line 12 does not agitate fluid in the oil and water spaces of the vessel. A pressure relief valve 100 vents gas from gas space 14 when the gas pressure exceeds some predetermined value. In the event that the relief valve cannot handle this gas flow or failure of the relief valve, a safety head 102 can blow, venting the gas space.

Discharge from stand pipe 28 flows through a check valve 104 in line 50 and joins line 80 that is passing the underflow from the cyclone cleaner. Line 80 has a flow meter 106 in a parallel branch circuit. The flow meter can be isolated by closing a pair of valves 108 and 110 in the branch circuit. A valve 112 in line 80 can control the pressure of the underflow from cyclone 22. A regulator 114 in line 80 also controls underflow pressure from the cyclone.

As previously mentioned, a line 52 from gas space 14 joins the underflow and the discharge from the stand pipe and the three flow in a line 116 to the battery.

An alternate line 120 permits the triplex to draw off water from water space 18 of the tank when a valve 122 in line 120 is opened and pump 26 operated. A drain line 124 tees off a trap in line 120 and leads to a drain.

Sight gate columns 130 and 132 permit the gauging of liquid level within tank 10. Tank 10 is supported by cradles 134 and 136 that extend upright from a sled 138. Tank 10 may be formed of a large cylindrical shell capped by headers at either end. An access manhole 139 into one of the headers permits access to the inside of the tank.

With reference to FIG. 2 an organization very similar to that shown in FIG. 1 is illustrated in abbreviated form. The FIG. 2 system provides for an anterior tank 140 for compensating for surges. A separation tank 142 has a separation section 144 separated from a discharge section 146 by a vertical weir 148 in the form of an upstanding bulkhead between the two sections. The bulkhead is attached to the wall of the tank proper as by welding.

A discharge siphon 150 extends through wall 148 into separation compartment 144 near the base thereof. An outlet 152 in discharge siphon 150 provides for the outlet of water from the separation compartment. Siphon 150 includes a line 154 that attaches to an elbow 156 through flange 158 of line 154 and flange 160 of elbow 156, and appropriate fasteners. A fitting in the shell of separation tank 142 can receive an extension of line 154 for an easy change of the height of outlet 152, as in the embodiment described with reference to FIG. 1.

Fluid from the well normally enters tank 142 through a feed line 162 from anterior tank 140 to a cyclone 164 and a line 165 from the clean fluid discharge of the cyclone to separation section 144. A flow control valve 166 in a line 162 meters to flow from tank 140 to the cyclone. The underflow from cyclone 164 passes through a line 167 and flow control valve 169 in line 167 into a discharge line 170. Discharge line 170 comes from discharge compartment 146 of vessel 142. A check valve 172 in line 170 prevents backflow through the line. Flow control valve 166 in line 168 and flow control valve 169 in discharge line 170 establish the required pressure differential across cyclone 164. A check valve 174 in line 165 prevents backflow through that line.

A pump 176 in a line 178 provides for the introduction of power fluid into a well. A line 180 from separation compartment 144 at a level corresponding to, say oil, provides the access to the power fluid. A water line 188 from vessel 142 tees into line 178 and permits the use of water as the power fluid. Valves 190 and 192 in lines 180 and 188, respectively, can open and close the lines.

A recirculation line 196 from the discharge of pump 176 permits the recirculation of fluid from tank 142 back into the tank. Line 196 tees off of line 178 downstream of pump 176 and tees into line 165. A check valve 198 in line 196 prevents backflow through it. Flow through line 196 is determined by a flow control valve 200.

A relief valve 202 from the gas space in tank 142 vents that space when there is excessive pressure.

Well fluid entering tank 140 normally accumulates in that tank to a level at, say, about 210. Fluid will flow from the tank through line 162 into cyclone 164. The underflow from the cyclone goes into line 167 and to, say, a battery through line 170. The clean stream from the cyclone passes into separator vessel 142 through line 165. Phase separation occurs within the vessel and the interface between the phases maintained, say, at level 212, by the position of outlet 152 of syphon 150. Excess oil in separation compartment 144 goes over the top of weir 148 into discharge compartment 146 and passes from the vessel through line 170. Water flows through outlet 152 into the discharge compartment and passes out of the vessel through line 170. Upon a surge, fluid will flow through a surge line 214 directly into discharge compartment 146 from vessel 140 to prevent overloading the system upstream of discharge compartment 146. For example, a surge might otherwise exceed the separation rate of fluid in vessel 142 resulting in a polyphase fluid at the takeoff for the power fluid. A backpressure regulator 216 in line 214 prevents excessive flow through the line.

The present invention has been described with reference to a preferred embodiment. The spirit and scope of the appended claims should not, however, necessarily be limited to the foregoing description.

What is claimed is:

1. An improved method of providing a power liquid to downhole machinery of a petroleum well by a system including a separation vessel for separating production liquid from the well into liquid phases, a pump for increasing the hydrodynamic head of the power liquid taken from at least one of the liquid phases separated from the production fluid in the separation vessel, and means for re-introducing power liquid of such increased hydrodynamic head back into the well, the improvement comprising:

(a) providing partition means in the separation vessel to separate the tank into at least two compartments, a first of these compartments liquid dimensioned to accomodate surges of production liquid, and a second of these compartments being for the phase separation of production liquid fed from the first compartment;

(b) providing flow line means from the second compartment for the discharge of liquid therefrom;

(c) providing flow line means from the first compartment for providing the power liquid to a pump;

(d) providing liquid phase level control means for the first compartment comprising a phase level control line in the separation vessel between the first and second compartments, the phase level control line having an entrance in the first compartment at a level corresponding to the water phase and an outlet in the second compartment, the entrance being lower in elevation than the outlet, the flow line means from the second compartment having an entrance lower in elevation than the outlet of the phase level control line, whereby a minimum liquid level is maintained in the first compartment to act as a reservoir for power liquid and an interface between the oil phase and water phase is maintained within a desired elevational band; and (e) feeding production liquid from said first compartment through said phase level control line to said second compartment.

2. The improvement claimed in claim 1 including providing augmenting cleaning means in the flow line means from the first compartment to further clean the power fluid.

3. The improvement claimed in claim 1 wherein the fluid phase level control means is provided with means to adjust the height of the outlet of the line thereof whereby the minimum liquid level can be varied.

4. The improvement claimed in claim 3 wherein the adjustment means is provided with a phase level control line, such line including a removable line into the second compartment and having the outlet of the phase level control line, and a fixed line, the removable line being removably secured to the fixed line.

5. The improvement claimed in claim 4 wherein the separation means is provided with a partition, the top of the partition acting as a weir for discharge liquid passing into the second compartment, the weir augmenting the fluid phase level control means for discharging liquid into the second compartment.

6. The improvement claimed in claim 5 wherein the flow line means into the first compartment for the power fluid is provided with an entrance in the first compartment above the entrance from the first compartment into the fluid phase level control line and below the height of the partition to cause the power liquid to be oil.

* * * * *

UNITED STATES PATENT AND TRADEMARK OFFICE
CERTIFICATE OF CORRECTION

PATENT NO. : 4,233,154
DATED : Nov. 11, 1980
INVENTOR(S) : Charles L. Presley

It is certified that error appears in the above—identified patent and that said Letters Patent is hereby corrected as shown below:

In the abstract: Next to last line, "dicharge" should be --discharge--.

In the specification: Column 2, line 14, "Serparation" should be --separation--; Column 2, line 68, "levation" should be --elevation--; Column 4, line 8, "the" should be --The--; Column 6, line 47, "to" first occurrence, should be --the--.

In the claims: Column 7, line 47, claim 1, "accomodate" should be --accommodate--.

Signed and Sealed this

Twenty-first Day of April 1981

[SEAL]

Attest:

RENE D. TEGTMEYER

*Attesting Officer*   *Acting Commissioner of Patents and Trademarks*